United States Patent
Ohrbom et al.

(10) Patent No.: US 6,777,495 B2
(45) Date of Patent: Aug. 17, 2004

(54) POWDER COATING WITH TRIS(HYDROXYETHYL) ISOCYANURATE-ANHYDRIDE REACTION PRODUCT CROSSLINKER

(75) Inventors: Walter H. Ohrbom, Hartland Township, MI (US); David J. Law, Livonia, MI (US); Robert D. Weise, Harper Woods, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 10/191,643

(22) Filed: Jul. 9, 2002

(65) Prior Publication Data

US 2004/0010084 A1 Jan. 15, 2004

(51) Int. Cl.[7] .......................... C08K 3/22; C08L 33/14; C08L 63/00
(52) U.S. Cl. .................. 525/176; 523/458; 525/208; 525/221; 525/437; 525/438; 525/440; 525/444; 525/445
(58) Field of Search ................... 525/533, 176, 525/208, 221, 437, 438, 440, 444, 445; 523/458

(56) References Cited

U.S. PATENT DOCUMENTS

| | | | |
|---|---|---|---|
| 3,336,251 A | * 8/1967 | Manasia | 523/447 |
| 4,268,656 A | * 5/1981 | Ray-Chaudhuri et al. | 528/103 |
| 4,849,283 A | * 7/1989 | Porter et al. | 428/323 |
| 5,371,167 A | 12/1994 | Rehfuss et al. | 528/73 |
| 5,744,522 A | * 4/1998 | Prucnal et al. | 523/442 |
| 5,925,285 A | 7/1999 | Ramesh | 252/182.28 |
| 5,959,060 A | 9/1999 | Schäfer et al. | 528/84 |
| 6,130,297 A | 10/2000 | Ramesh | 525/327.3 |
| 6,255,392 B1 | 7/2001 | Inoue et al. | 525/101 |
| 6,407,183 B1 | * 6/2002 | Shimada et al. | 525/524 |

FOREIGN PATENT DOCUMENTS

| | | | |
|---|---|---|---|
| EP | 0 553 702 | 1/1993 | C08G/18/36 |
| EP | 0 835 914 | 9/1997 | C09D/133/06 |
| GB | 1 055 090 | 1/1967 | C07D/55/38 |
| JP | 2001-59014 A2 * | 3/2001 | |
| JP | 2001-59015 A2 * | 3/2001 | |
| JP | 2001-59016 A2 * | 3/2001 | |
| JP | 2002-160322 A2 * | 6/2002 | |

* cited by examiner

Primary Examiner—Robert Sellers

(57) ABSTRACT

Powder coating composition for automotive exterior coatings with compatibility with other coatings and resistance to yellowing include a film-forming material such as a polyepoxide and an acid-functional crosslinker that is a reaction product of 1,3,5-tris(2-hdyroxyethyl)isocyanurate and a cyclic anhydride.

17 Claims, No Drawings

POWDER COATING WITH TRIS(HYDROXYETHYL) ISOCYANURATE-ANHYDRIDE REACTION PRODUCT CROSSLINKER

FIELD OF THE INVENTION

This invention concerns thermoset powder coating compositions, especially for automotive vehicles.

BACKGROUND OF THE INVENTION

Powder coating compositions have become increasingly important because they give off very little or no volatile material to the environment when cured. Typically, any such emissions are limited to by-products of the curing reaction, such as blocking agents or volatile condensation products. Powder coatings have found use as both decorative coatings and protective coatings.

Topcoats for automotive and other industrial applications may be a one-layer coating, in which the color is generally uniform through the coating layer, or a clearcoat-basecoat composite coating, having a colored basecoat layer underlying a transparent clearcoat layer. Clearcoat-basecoat composite coatings are widely used in the coatings art and are notable for desirable gloss, depth of color, distinctness of image and/or special metallic effects. Composite systems are particularly utilized by the automotive industry to achieve a mirror-like, glossy finish with a high depth of image. All of the coating layers, including the underlying primer layer or layers, should be as smooth as possible to attain the best depth of image.

It is also important for topcoats, including the clearcoat-basecoat composite coatings, to provide the desired color. Automotive bodies are generally first coated with a layer of a cathodic electrocoat primer and/or other primer layer. In the case of cathodic electrocoat primers, the salting amine that remains in the cured electrocoat primer layer may be volatilized during thermal cure of later applied coating layers causing undesirable yellowing in those layers.

Acrylic polymers have been widely used in solventborne and aqueous topcoat coating compositions. Earlier attempts to formulate an acrylic powder coating composition for topcoats, however, have met with difficulties. One problem has been the tendency of the acrylic powder coating to contaminate other coating compositions being used in the manufacturing plant, causing cratering and other appearance problems.

Rehfuss and Ohrbom, in U.S. Pat. No. 5,371,167, describe solventborne coatings, particularly for automotive clearcoats, containing carboxyl-functional crosslinkers having a cyanuric ring and epoxide-functional acrylic polymers. The coating composition of Example 8, in particular, contains an epoxide-functional acrylic polymer and the acid-functional reaction product of 1,3,5-tris(2-hydroxyethyl) cyanuric acid and methylhexahydrophthalic anhydride. The patentees teach that it is necessary to include solvent to obtain flow and leveling in the coating. Solventborne coatings, however, produce regulated organic emissions which require costly abatement procedures and equipment.

Inoue et al., U.S. Pat. No. 6,255,392 describe a topcoat composition containing a vinyl copolymer with hydrolyzable silyl groups and hydroxyl groups, a compound with hydroxyl groups, and solvent. The coating composition may also contain a carboxyl-functional compound, apparently to improve recoating adhesion. The carboxyl-functional compound may be the half-ester of an acid anhydride reacted with a polyol. The carboxyl groups are not reacted in curing the topcoat. The Inoue patent also does not discuss powder coatings or the powder coating problems we have mentioned above.

Ramesh, U.S. Pat. Nos. 5,925,285 and 6,130,297, describes low gloss coatings including 1,3,5-tris-(2-carboxyethyl)isocyanurate, a dicarboxylic acid crosslinking agent, and a polyepoxide resin. Automotive coatings, however, must be glossy. Automotive topcoat coatings must have high gloss for aesthetic reasons. Automotive primers are also formulated to be fairly glossy because, among other reasons, the glossiness makes defects such as dirt more obvious so that the defect can be seen and repaired before the topcoat layers are applied.

SUMMARY OF THE INVENTION

The powder coating composition of the invention contains an acid-functional crosslinker that is a reaction product of 1,3,5-tris(2-hdyroxyethyl)isocyanurate and a cyclic anhydride and a film-forming material reactive with the acid-functional crosslinker. The powder coating may be a clearcoat composition, a basecoat composition, a pigmented, single-layer topcoat composition, or a primer composition.

The powder coating of the invention unexpectedly avoids the contamination and yellowing problems of earlier powder coatings. The reduced yellowing is achieved for composite coatings applied over cathodic electrocoat coatings, wherein the layer obtained with the powder coating of the invention may be a primer layer, a basecoat layer, a clearcoat layer, or a single layer topcoat. The powder coating composition of the invention provides a coating layer with excellent smoothness and gloss, which is especially desirable in a topcoat layer, especially a clearcoat layer. The acid-functional crosslinker of the invention also provides improved pigment dispersion and better color development in pigmented coating compositions.

DETAILED DESCRIPTION OF THE PREFERRED EMBODIMENTS

The following description of the preferred embodiment(s) is merely exemplary in nature and is in no way intended to limit the invention, its application, or uses.

First, the powder coating composition of the invention contains an acid-functional crosslinker. The acid-functional crosslinker is a reaction product of 1,3,5-tris(2-hdyroxyethyl)isocyanurate and a cyclic anhydride. The cyclic anhydride is preferably selected to provide a reaction product that has a softening point of at least about 60° C., preferably a softening point of at least about 80° C. The softening point may be determined by standard methods. In one method, the softening point may be observed using an apparatus that slowly heats a sample at a steady rate. Suitable cyclic anhydrides include, without limitation, phthalic anhydride, hexahydrophthalic anhydride, methylhexahydrophthalic anhydride, tetrahydrophthalic anhydride, trimellitic anhydride, and combinations of these.

The ratio of moles of the cyclic anhydride to 1,3,5-tris (2-hdyroxyethyl)isocyanurate are preferably from about 2 to about 3 moles of cyclic anhydride for each mole of 1,3,5-tris(2-hdyroxyethyl)isocyanurate, although the cyclic anhydride may be used in a greater excess.

The reaction between the 1,3,5-tris(2-hdyroxyethyl) isocyanurate and the cyclic anhydride may be carried out neat or in a solvent medium followed by removal of the solvent from the product (e.g., by vacuum stripping). Typical reaction conditions for reaction of an alcohol with a carboxylic acid anhydride may be used.

The powder coating composition of the invention further contains a film-forming material that is reactive with the carboxylic acid-functional crosslinker. The film-forming materials may, for example, include epoxide functionality and/or hydroxyl functionality, especially hydroxyl functionality that is activated by being beta to an electron-donating center, e.g. a nitrogen-containing functional group. The film forming material has at least two acid-reactive functional groups per molecule. The film-forming material is preferably oligomeric or polymeric, but compounds without repeating units may also be used, particularly in combination with oligomeric or polymeric materials. The film-forming materials are selected to be suitable for forming powder coating compositions, e.g. selected to allow processing to a powder coating of the desired particle size and to provide adequate shelf-life.

Suitable polyepoxide materials that can be used as the acid-reactive film-forming material have at least two epoxide groups, preferably more than two epoxide groups. The polyepoxide material may be a compound without repeating monomeric units, an oligomer, or a polymer. Many such materials are known to be useful in powder coating compositions. Specific examples include, without limitation, epoxide-functional vinyl polymers, including epoxide functional acrylic polymers, such as those prepared by copolymerization of allyl glycidyl ether, glycidyl acrylate, and/or glycidyl methacrylate; other epoxide functional polymers, such as epoxide functional polyesters and epoxide functional polyurethanes, which may be prepared, for examples, by reaction of hydroxyl groups with epihalohydrins such as epichlorohydrin; glycidyl ethers of polyhydric phenols and polyols, particularly of solid bisphenol A oligomers, hydrogenated bisphenol A oligomers, solid bisphenol F oligomers, hydrogenated bisphenol F oligomers, and solid alicyclic epoxy resins; epoxides of novolac materials; glycidyl esters of polycarboxylic acids, such as diglycidyl isophthalate; vinyl cyclohexene epoxides such as 4-vinyl-1-cyclohexene diepoxide; 1,2,5,6-diepoxycyclooctane; 1,2,7,8-diepoxyoctane; dicyclopentadiene diepoxide; 1,4-divunylbenzeene diepoxide; triglycidyl isocyanurate, and combinations of these.

A suitable epoxide-functional acrylic copolymer should have a weight average molecular weight of from 1500 to 40,000. Preferably, the weight average molecular weight of the acrylic copolymer is from 2000 to 25,000. An acrylic copolymer having a weight average molecular weight of from 2000 to 10,000 is preferred. The acrylic copolymer also preferably has an epoxide equivalent weight from 240 to 1000, more preferably from 300 to 900, and most preferably from 300 to 700. In another embodiment, a bisphenol A epoxy resin is used. Bisphenol A epoxy resins are prepared by reaction of bisphenol A and epichlorohydrin. The epoxide-functional bisphenol A epoxy resins preferably have epoxide equivalent weights from about 500 to about 2000, more preferably from about 600 to about 1000.

Hydroxyl-functional materials that can be used as the acid-reactive film-forming material have at least two hydroxyl groups, preferably activated hydroxyl groups. Suitable hydroxyl-functional film-forming materials include, without limitation, solid compounds, oligomers, and polymers having two or more hydroxyl groups that are beta to the nitrogen of amide groups or urea groups, such as N,N,N',N'-tetrakis[2-hydroxyethyl]-hexanediamide. One commercially available product is PRIMID QM-1260, available from EMS-Chemie AG.

The acid-reactive material and the acid-functional crosslinker are preferably included in the powder coating composition in ratios of from 0.8 to 1.5 equivalents of acid-reactive functionality for each equivalent of carboxylic acid.

It may be desirable in some instances to include a catalyst for the curing reaction. Among the catalysts that are effective for reaction of carboxylic acid groups with epoxide are tertiary amines such as benzyl dimethyl amine, quaternary amine salts such as tetrabutyl ammonium diamine, triphenyl phosphate, and other such oxirane-activating catalysts. The beta hydroxyl groups are activated by standard esterification catalysts, including Brønsted Lowry acids and Lewis acids.

The powder coating may contain other film-forming materials, including materials that cure by means other than reaction with the carboxylic acid groups of the acid-functional crosslinker. For example, the powder coating may include radiation or UV-curable film-forming materials; other acid-functional or anhydride-functional materials such as dodecane dicarboxylic acid, acid-functional acrylic polymers and other acid-functional vinyl polymers, acid-functional polyesters, and acid-functional polyurethanes; and materials reactive with hydroxyl groups, including those produced by reaction of the acid-functional crosslinker with epoxide-functional resins, such as aminoplast resins and blocked polyisocyanates.

It may be desirable to incorporate into the powder coating composition other materials, such as fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers, antioxidants, processing aids, anti-blocking agents, anti-cratering agents such as fumed silica, clay, talc, fumed alumina, and precipitated silica, and/or catalysts. Moreover, a texturing agent may also be included, for example to more finely adjust the degree of texture.

Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, and lead molybdate. Special effect pigments may be incorporated to produce a "metallic effect" or gonioapparent appearance, for example and without limitation metal flake pigments, including aluminum pigment, colored aluminum pigments, and bronze pigment, and pearlescent mica flake pigments, and other pearlescent pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 50° C. to 120° C.

The extrudate is then cooled and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions.

Application can be, for example, by electrostatic spraying or by use of a fluidized bed. Electrostatic spraying is the preferred method. The coating powder can be applied in one or more passes to provide a film thickness after cure of typically from about 20 to about 100 microns. The substrate can optionally be preheated prior to application of a powder coating composition to promote uniform and thicker powder deposition.

After application of the coating composition to the substrate, the coating is cured, preferably by heating at a temperature and for a length of time sufficient to cause the reactants to form an insoluble polymeric network. The cure temperature is usually from about 145° C. to about 205° C., and the length of cure is usually about 15 minutes to about 60 minutes. Preferably, the coating is cured at about 150° C. to about 180° C. for about 20 to about 30 minutes. Heating can be done in infrared and/or convection ovens.

The powder coating composition of the invention can be formulated as a primer coating composition, a basecoat coating composition, or a clearcoat coating composition. Basecoat coating compositions include appropriate pigments to provide the desired color and/or special effect to the coating layer. Clearcoat coating compositions do not include opaque pigments.

The invention is further described in the following example. The examples are merely illustrative and do not in any way limit the scope of the invention as described and claimed. All parts are parts by weight unless otherwise noted.

EXAMPLE 1A

Preparation of Acid-Functional Ester of Tris(2-hydroxyethyl)isocyanurate

A mixture of 47.6 parts by weight of hexahydrophthalic anhydride and 19.0 parts by weight of xylene was heated to 130° C. under an inert atmosphere. At that temperature, a total of 28.3 parts by weight of tris(2-hydroxyethyl) isocyanurate was added in a series of small portions, followed by 1 part by weight of xylene. The reaction mixture was then heated to 145° C. and held at that temperature until the reaction was complete. The reaction mixture was then cooled to 130° C. and 4.1 parts by weight of isobutanol was added. The reaction mixture was held for 2 hours at 130° C. The xylene and excess isobutanol were then removed by vacuum distillation to obtain a hard, clear, solid material that softened at about 95° C.

EXAMPLE 1B

Powder Coating According to the Invention

The following materials were dry blended for about a minute: 263.2 parts by weight of the acid-functional ester of Example 1A, 412.8 parts by weight of an epoxide-functional, powdered acrylic polymer, 3.5 parts by weight of benzoin, 10.0 parts by weight of Estron Resiflow PL-200 (obtained from Estron Chemical Inc.), 260 parts by weight of titanium dioxide pigment, 0.5 parts by weight of carbon black pigment, and 50 parts by weight of barium sulfate. The dry blend was processed at 250 RPM through a ZSK-30 twin screw extruder (obtained from WernerPfliederer) having a first zone temperature of 90° C. and a second zone temperature of 70° C. The extrudate was cooled and pulverized, then classified with a 200 mesh sieve to produce a powder coating.

The powder coating was applied to a steel substrate using an electrostatic spray gun. The applied coating was cured in a convection oven at 300° F. for 20 minutes. The cured coating had a 200 gloss of 53.

EXAMPLE A

Comparative Powder Coating With Acid-Functional Crosslinker

A comparative powder coating was prepared by drying blending the following materials for about a minute: 144.8 parts by weight of dodecane dicarboxylic acid, 531.2 parts by weight of the epoxide-functional, powdered acrylic polymer of Example 1B, 3.5 parts by weight of benzoin, 10.0 parts by weight of Estron Resiflow PL-200, 260 parts by weight of titanium dioxide pigment, 0.5 parts by weight of carbon black pigment, and 50 parts by weight of barium sulfate. The dry blend was processed at 250 RPM through a ZSK-30 twin screw extruder (obtained from WernerPfliederer) having a first zone temperature of 90° C. and a second zone temperature of 70° C. The extrudate was cooled and pulverized, then classified with a 200 mesh sieve to produce a powder coating.

The powder coating was applied to a steel substrate using an electrostatic spray gun. The applied coating was cured in a convection oven at 300° F. for 20 minutes. The cured coating had a 20° gloss of 4.

The invention has been described in detail with reference to preferred embodiments thereof. It should be understood, however, that variations and modifications can be made within the spirit and scope of the invention.

What is claimed is:

1. A powder coating composition, comprising solid particulates comprising in admixture (a) acid-functional crosslinker consisting essentially of reaction product of 1,3,5-tris(2-hydroxyethyl)isocyanurate and a cyclic anhydride; one or more members selected from the group consisting of dodecane dicarboxylic acid, acid-functional acrylic polymers, other acid-functional vinyl polymers, and acid-functional polyurethanes; and (b) a film-forming material reactive with the acid-functional product of (a).

2. A powder coating composition according to claim 1, wherein the coating composition is unpigmented.

3. A powder coating composition according to claim 1, wherein the solid particulates further comprise at least one pigment.

4. A powder coating composition according to claim 1, wherein the material (b) is a polyepoxide material.

5. A powder coating composition according to claim 4, wherein the polyepoxide material comprises an epoxide-functional vinyl resin.

6. A powder coating composition according to claim 4, wherein the polyepoxide material comprises an copolymer of a member selected from the group consisting of allyl glycidyl ether, glycidyl acrylate, glycidyl methacrylate and combinations thereof.

7. A powder coating composition according to claim 4, wherein the polyepoxide material comprises a glycidyl ether of a polyhydric phenol or of a polyol.

8. A powder coating composition according to claim 4, wherein the polyepoxide material comprises a glycidyl ester of a polycarboxylic acid.

9. A powder coating composition according to claim 4, wherein the. polyepoxide material comprises triglycidyl isocyanurate.

10. A powder coating composition according to claim 1, wherein the material (b) has an equivalent weight of from about 240 to about 2000.

11. A powder coating composition according to claim 1, wherein the acid-functional reaction product has a softening point of at least about 60° C.

12. A powder coating composition according to claim 1, wherein the cyclic anhydride comprises at least one member selected from the group consisting of phthalic anhydride, hexahydrophthalic anhydride, methylhexahydrophthalic anhydride, tetrahydrophthalic anhydride, trimellitic anhydride, and combinations thereof.

13. A powder coating composition according to claim 1, wherein the ratio of 1,3,5-tris(2-hdyroxyethyl)isocyanurate to cyclic anhydride in making the reaction product (a) is 1 mole 1,3,5-tris(2-hdyroxyethyl)isocyanurate to from about 2 to about 3 moles of cyclic anhydride.

14. A powder coating composition according to claim 1, wherein the ratio of the material (b) to the acid-functional reaction product (a) is from about 0.8 to about 1.3 equivalents of (b) to 1 equivalent carboxylic acid of (a).

15. A powder coating composition according to claim 1, wherein the material (b) comprises two or more hydroxyl groups, wherein each hydroxyl group is beta to a nitrogen of a member selected from the group consisting of urethane groups, amide groups, carbamate groups, and urea groups.

16. A powder coating composition according to claim 1, wherein the material (b) comprises a member selected from the group consisting of epoxide-functional polyesters and epoxide-functional polyurethanes.

17. A powder coating composition, comprising solid particulates comprising in admixture (a) an acid-functional reaction product of 1,3,5-tris(2-hydroxyethyl)isocyanurate and a cyclic anhydride, and consisting of (b) a film-forming material reactive with the acid-functional product of (a).

* * * * *